(12) United States Patent
Shimahara et al.

(10) Patent No.: US 11,261,895 B2
(45) Date of Patent: Mar. 1, 2022

(54) FRACTURE NUT HAVING A FRACTURE SURFACE HAVING A LARGE APERTURE ANGLE

(71) Applicant: Hilti Aktiengesellschaft, Schaan (LI)

(72) Inventors: Hideki Shimahara, Grabs (CH); Erich Infanger, Schiers (CH)

(73) Assignee: Hilti Aktiengesellschaft, Schaan (LI)

( * ) Notice: Subject to any disclaimer, the term of this patent is extended or adjusted under 35 U.S.C. 154(b) by 320 days.

(21) Appl. No.: 16/475,391

(22) PCT Filed: Dec. 5, 2017

(86) PCT No.: PCT/EP2017/081487
§ 371 (c)(1),
(2) Date: Jul. 2, 2019

(87) PCT Pub. No.: WO2018/127337
PCT Pub. Date: Jul. 12, 2018

(65) Prior Publication Data
US 2019/0338796 A1    Nov. 7, 2019

(30) Foreign Application Priority Data
Jan. 5, 2017  (EP) ..................... 17150334

(51) Int. Cl.
*F16B 13/06* (2006.01)
*F16B 31/02* (2006.01)
*F16B 37/14* (2006.01)

(52) U.S. Cl.
CPC .......... *F16B 13/065* (2013.01); *F16B 31/021* (2013.01); *F16B 37/14* (2013.01); *F16B 13/06* (2013.01)

(58) Field of Classification Search
CPC ........ F16B 13/065; F16B 31/00; F16B 31/02; F16B 31/021; F16B 31/025; F16B 31/028;
(Continued)

(56) References Cited

U.S. PATENT DOCUMENTS

| 1,380,395 A | * | 6/1921 | Korach | ................. F16B 39/286 411/3 |
| 2,394,812 A | * | 2/1946 | Seitz | ..................... F16B 39/286 411/5 |

(Continued)

FOREIGN PATENT DOCUMENTS

| AU | 2009200994 | 11/2009 |
| CN | 202914489 U | 5/2013 |

(Continued)

OTHER PUBLICATIONS

International Search Report of PCT/EP2017/081487, dated Feb. 24, 2018.
(Continued)

*Primary Examiner* — Roberta S Delisle
(74) *Attorney, Agent, or Firm* — Davidson, Davidson & Kappel, LLC

(57) ABSTRACT

A device for torque limiting, has a nut having a female thread. A holding element includes a top part having an entrainment profile in a rear area of the holding element for the rotatably fixed coupling of the top part with a setting tool and a receiving part having a receptacle in a front area of the holding element, in which the nut is rotatably fixedly accommodated, the top part having a passage, through which a threaded rod screwed into the nut may be led out of the holding element through the top part along the longitudinal axis of the device. The holding element includes a web connecting the receiving part and the top part and which forms a predetermined breaking point. In at least one lon- (Continued)

gitudinal sectional plane of the device, the smallest wall thickness of the at least one web is present on a line segment of minimum wall thickness, which runs at an angle greater than 45° with respect to the longitudinal axis of the device. A fastening arrangement includes the device.

18 Claims, 3 Drawing Sheets

(58) Field of Classification Search
CPC .......... F16B 31/04; F16B 37/14; F16B 13/06; Y10S 411/917
USPC ..................................... 411/1, 2, 3, 5–6, 432
See application file for complete search history.

(56) References Cited

U.S. PATENT DOCUMENTS

| | | | |
|---|---|---|---|
| 3,370,341 A * | 2/1968 | Allsop | B65D 21/0219 |
| | | | 29/413 |
| 3,444,775 A * | 5/1969 | Hills | F16B 31/021 |
| | | | 411/5 |
| 3,482,864 A * | 12/1969 | Bynum | F16B 31/021 |
| | | | 411/5 |
| 3,728,933 A | 4/1973 | Grube et al. | |
| 3,742,583 A * | 7/1973 | Devlin | F16B 31/021 |
| | | | 29/413 |
| 3,978,761 A * | 9/1976 | Sosinski | F16B 31/021 |
| | | | 411/5 |
| 4,046,052 A | 9/1977 | Nordstrom | |
| 4,215,600 A | 8/1980 | Kesselman et al. | |
| 4,729,703 A * | 3/1988 | Sato | F16B 31/021 |
| | | | 411/237 |
| 5,865,581 A * | 2/1999 | Sadri | F16B 31/021 |
| | | | 411/5 |
| 6,176,659 B1 * | 1/2001 | Hardt | F16B 31/021 |
| | | | 411/393 |
| 6,406,240 B1 * | 6/2002 | Potter | F16B 37/0864 |
| | | | 411/267 |
| 9,194,417 B2 | 11/2015 | Marchand et al. | |
| 9,316,248 B2 | 4/2016 | Appl et al. | |
| 9,970,467 B2 | 5/2018 | Dijkhuis et al. | |
| 10,584,731 B2 | 3/2020 | Gstach et al. | |
| 2002/0076295 A1 | 6/2002 | Gibbons | |
| 2003/0198528 A1 | 10/2003 | Onishi et al. | |
| 2004/0226419 A1 | 11/2004 | Morgan | |
| 2012/0328388 A1 * | 12/2012 | Hardt | H01R 4/307 |
| | | | 411/5 |
| 2013/0303293 A1 | 11/2013 | Eckstein et al. | |
| 2015/0226248 A1 * | 8/2015 | Robertson, Jr. | F16B 31/021 |
| | | | 405/288 |
| 2016/0053792 A1 | 2/2016 | Rosenkranz et al. | |
| 2016/0305464 A1 * | 10/2016 | Balderrama | F16B 31/021 |
| 2017/0343026 A1 | 11/2017 | Schaeffer | |
| 2019/0331154 A1 | 10/2019 | Shimahara | |
| 2019/0338800 A1 | 11/2019 | Shimahara | |

FOREIGN PATENT DOCUMENTS

| | | |
|---|---|---|
| CN | 103180623 B | 6/2013 |
| CN | 203230709 U | 9/2013 |
| CN | 105190058 A | 12/2015 |
| CN | 105556138 A | 5/2016 |
| CN | 105705804 A | 6/2016 |
| CN | 105829735 A | 8/2016 |
| DE | 102010042260 | 4/2012 |
| DE | 102010043167 | 5/2012 |
| DE | 102011106696 A1 | 1/2013 |
| EP | 1353080 | 10/2003 |
| EP | 1353080 | 8/2015 |
| EP | 2952755 | 8/2020 |
| FR | 2598855 A1 | 11/1987 |
| GB | 1330320 | 9/1973 |
| JP | S4520582 Y1 | 8/1970 |
| JP | H0685918 U | 12/1994 |
| JP | 2000257623 A | 9/2000 |
| JP | 2001140832 A | 5/2001 |
| RU | 2012105535 A | 8/2013 |
| WO | WO2011007052 A1 | 1/2011 |
| WO | WO2017050725 | 3/2017 |
| WO | WO2018127336 | 7/2018 |
| WO | WO2018127338 | 7/2018 |

OTHER PUBLICATIONS

U.S. Appl. No. 16/475,509, filed Jul. 2, 2019, published as US 2019/0331154 A1on Oct. 31, 2019.

U.S. Appl. No. 16/475,486, filed Jul. 2, 2019, published as US 2019-0338800 A1 on Nov. 7, 2019.

* cited by examiner

FRACTURE NUT HAVING A FRACTURE SURFACE HAVING A LARGE APERTURE ANGLE

The present invention relates to a device for torque. A device of this type includes a nut and a holding element, the holding element including a top part having an entrainment profile in a rear area of the holding element for the rotatably fixed coupling of the top part with a setting tool, the holding element including a receiving part having a receptacle in a front area of the holding element, in which the nut is rotatably fixedly accommodated, the top part having a passage, through which a threaded rod screwed into the nut may be led out of the holding element through the top part along the longitudinal axis of the device, and the holding element including at least one web, which connects the receiving part and the top part and which forms a predetermined breaking point. The present invention also relates to a fastening arrangement, which includes a device of this type and an expansion anchor.

BACKGROUND

A generic device for torque limiting is known from DE 102010043167 A1, which may be used in connection with expansion anchors and which has a predetermined breaking point, which breaks upon reaching a limiting torque. According to DE 102010043167 A1, the device includes an axial stop on the top part for the rotationally decoupled axial force transmission from the top part to the nut, so that the predetermined breaking point is preserved during hammering.

Other devices for torque limiting are described in EP 1353080 B1 and in the international patent application having the PCT file number PCT/EP2016/072232, now published as WO2017050725 A1.

Other devices for torque limiting, which may be mounted on nuts or bolt heads, are known from FR 2598855 A1 and U.S. Pat. No. 4,215,600 A.

A screw having a multi-part head is derived from DE 102011106696 A1 which includes an outer sleeve, which is rotatable around an inner part of the head.

SUMMARY OF THE INVENTION

It is an object of the present invention to provide a device for torque limiting, which ensures a particularly high breaking precision and reliability with little complexity, in particular manufacturing complexity, in particular with respect to using the device in connection with expansion anchors, as well as to provide a corresponding fastening arrangement.

According to the present invention, the object is achieved by a device for torque limiting and a fastening arrangement. Preferred specific embodiments of the device are provided in the dependent claims.

The device according to the present invention for torque limiting is characterized in that, in at least one longitudinal sectional plane of the device, the smallest wall thickness of the at least one web is present on a line segment of minimum wall thickness, which runs at an angle $\alpha$, in particular an acute angle $\alpha$, greater than 45° with respect to the longitudinal axis of the device.

The present invention is based on the finding that, when using generic devices for torque limiting, which have a passage for the threaded rod in their top part, special load situations may occur, which may in certain circumstances have an effect on the breaking precision of the predetermined breaking point. In particular, devices of this type may be used in combination with expansion anchors which are frequently mounted in so-called through-hole technology. In this type of assembly, the nut of the device is already screwed onto the threaded rod of the expansion anchor at the beginning of the assembly operation, and the expansion anchor, with the screwed-on nut, is driven through an attachment part into a borehole with the aid of hammer blows applied to the back of the threaded rod. The present invention has furthermore found that axial inertial forces and other stresses may occur between the regularly relatively free top part, on the one hand, and the receiving part connected to the nut and thus to the expansion anchor, on the other hand, during the hammer blows, in particular due to the non-negligible masses of the components of the holding element. These stresses, in turn, may result in a premature weakening of the webs and thus an undesirably comparatively large scattering of the limiting torques at which the webs shear off. This is where the present invention comes in and proposes to dimension the webs in such a way that the line segment of minimum wall thickness which defines the minimum wall thickness of the particular web in the longitudinal sectional plane, i.e. the shortest connecting distance between the inside and the outside of the holding element in the longitudinal sectional plane, is situated at a comparatively large angle, in particular a comparatively large acute angle, with respect to the longitudinal axis of the device, namely greater than 45° with respect to the longitudinal axis, preferably greater than 50° or 55° with respect to the longitudinal axis. Since the minimum wall thickness regularly at least approximately defines the breaking point, the fracture surface between the top part and the receiving part resulting during breaking has a correspondingly large aperture angle. It has been surprisingly found that, due to an arrangement of this type, the influence of the forces resulting from the hammer blows on the breaking behavior of the webs may be significantly reduced, so that particularly precise devices for torque limiting having particularly minimal scattering of the limiting torques may be obtained with little complexity.

According to usual practice, a longitudinal sectional plane may be understood to be, in particular, a sectional plane in which the longitudinal axis runs. The longitudinal axis of the device may be understood to be, in particular, the axis along which the threaded rod screwed into the nut runs, and/or the axis in which the torque is directed, which is applied to the top part with the aid of the entrainment profile. According to the definition according to usual practice, the longitudinal axis may be, in particular, an at least approximate axis of symmetry of the device.

According to usual practice, a line segment may be understood to be a straight line delimited by two points, i.e. a segment of a straight line. The line segment of minimum wall thickness is the segment running from the outside to the inside of the holding element, at which the wall thickness, i.e. the distance between the outside and the inside of the holding element, is minimal. The web is situated between the top part and the receiving part and connects the top part and the receiving part to each other. Since the web is solid, the length of its line segment of minimum wall thickness is greater than zero.

According to usual practice, angle $\alpha$, at which the line segment of minimum wall thickness runs with respect to the longitudinal axis of the device, is understood to be, in particular, the smaller of the two adjacent angles, i.e. in particular the acute angle. In other words, it is provided that the line segment of minimum wall thickness runs at an angle α greater than 45° and less than or equal to 90°, in particular less than 90°, with respect to the longitudinal axis of the device, i.e. 45°<α<=90°, preferably 45°<α<=90°. Angle α may be, in particular, an intersecting angle. Angle α preferably converges toward the front, i.e. the distance of the line segment of minimum wall thickness from the longitudinal axis decreases toward the front, i.e. in particular at an increasing distance from the top part, and/or angle α is open toward the back. However, an inverse arrangement is also conceivable, in which angle α converges toward the back.

The nut may be, for example, a DIN nut. It has a through-opening, in particular including at least one female thread, into which the threaded rod may be screwed.

The entrainment profile is used for rotatably fixedly coupling the output side of the setting tool to the top part and, in particular, for applying a torque from the setting tool to the top part, in particular a torque directed in the axial direction. The entrainment profile may be, for example, an outer polygonal profile, in particular an outer hexagonal profile, which is situated on the circumferential side of the top part. The setting tool may be, for example, a wrench or a handheld power tool.

The receptacle may be, in particular, a recess formed in the receiving part, into which the nut is placed. The receptacle is preferably delimited by the receiving part on the circumferential side and/or delimited by the top part on the rear side. The receiving part preferably forms a sleeve, which surrounds the receptacle and which thus also surrounds the nut, at least in areas. The nut is rotatably fixedly situated in the receptacle, in particular rotatably fixedly situated with the receiving part in the receptacle, i.e. a connection exists between the receiving part and the nut situated in the receptacle, preferably a form-fitting connection, which facilitates a transmission of a torque, in particular an axially directed torque, between the receiving part and the nut. The receptacle may preferably include another entrainment profile, for example an inner polygonal profile, in particular an inner hexagonal profile, for the rotatably fixed connection between the receiving part and the nut, which corresponds with an outer profile of the nut.

The top part has a passage for the threaded rod, i.e. the top part is designed, in particular, in the form of a sleeve. The threaded rod corresponding to the nut and screwed as intended into the nut may thus emerge from the holding element on the rear side of the holding element, i.e. the threaded rod may be guided through the device, in particular guided through the device along the longitudinal axis of the device. In particular, the top part and the receiving part may form coaxially situated sleeves, preferably sleeves situated coaxially to the longitudinal axis.

The at least one web connecting the receiving part and the top part, or the webs if multiple webs of this type are provided, forms or form a predetermined breaking point, in particular a predetermined breaking point for a rotation around the longitudinal axis, i.e. the web or webs breaks or break preferentially, interrupting the connection between the top part and the receiving part. Preferential breaking may be understood to mean, in particular, that the web or webs breaks or break at a lower torque than the top part and the receiving part.

The direction indications of front, back, front-side, rear, etc. are to be used uniformly here. For example, the front side of the nut is thus situated in front of the back side of the nut in the same direction as the receiving part situated in the front area of the holding element is positioned with respect to the top part situated in the rear area of the holding element. In particular, the rear end face of the receptacle may be understood to be the side of the receptacle facing the top part. In reference to the axial direction and the radial direction, these relate, in particular, to the longitudinal axis.

It is particularly advantageous that, in a large number of longitudinal sectional planes of the device, the smallest wall thickness of the at least one web is present on a line segment of minimum wall thickness, which runs at an angle, in particular an acute angle, greater than 45°, 55° or 60° with respect to the longitudinal axis of the device. In multiple longitudinal sectional planes of the device, therefore, the line segments of minimum wall thickness of the at least one web may preferably be situated within the angle range according to the present invention greater than 45°, 55° or 60° and less than or equal to 90°, preferably less than 90°, with respect to the longitudinal axis of the device. Accordingly, the fracture surface of the at least one web has multiple fracture lines, which run within the angle range according to the present invention with respect to the longitudinal axis of the device. The load bearing capacity may be further improved hereby.

The device may also include additional webs, which are designed similarly to the at least one web, for example two additional webs. In particular, the line segments of minimum wall thickness of the additional webs may be designed similarly to the at least one web.

One preferred refinement of the present invention is that, in the at least one longitudinal sectional plane of the device, the line segment of minimum wall thickness ends at the receptacle, in particular at the rear end face of the receptacle. Accordingly, the wall thickness minimum abuts the receptacle of the receiving part, in particular the back side of the receptacle. In this embodiment, the holding element may be particularly easily designed without undercuts, which permits, for example, a particularly easy and economical manufacturing in a casting process.

In particular, it may be provided that the holding element has at least one groove, which extends from the receptacle into the holding element and which runs along the at least one web, the line segment of minimum wall thickness ending at the groove. An elongated indentation in the holding element is thus provided, which is abutted by the wall thickness minimum. This may facilitate a particularly easy construction of the holding element and/or a particularly easy manufacturing. In addition, the groove may increase the precision of the breaking operation, due to the notching effect. The groove, i.e. the elongated indentation, preferably has a straight design. In particular, the groove may be situated on the rear end face of the receptacle, which may again permit an undercut-free design and thus a particularly easy and economical manufacturing in a casting process.

The top part suitably includes an axial stop, which forms a rear stop for the nut. This axial stop may be formed, for example, by projections or a ring, which protrude or protrudes on the top part in the direction of the receptacle. Since the axial stop may facilitate an additional, preferably direct and, in particular, rotationally decoupled force transmission between the top part and the nut, the at least one web may be further relieved by the axial stop, and the precision and reliability may thus be further increased without significantly impairing the limiting torque. Since the axial stop is assigned to the top part, it may be provided, in particular, that the at least one web is situated between the top part having the axial stop, on the one hand, and the receiving part, on the other hand. For a particularly compact, easy to manufacture and advantageous design with respect to the force transmission, it is preferably provided that the groove adjoins the at least one axial stop.

It is particularly preferred that the wall thickness of the at least one web has a unique minimum in the at least one longitudinal sectional plane of the device. In particular, the inside and the outside thus run in a non-parallel manner with each other at the web in the area of the minimum wall thickness. The breaking point may be particularly easily and effectively defined hereby, which may be advantageous, among other things, with regard to the precision.

The holding element is advantageously a cast part, preferably a zinc die cast part. This may be advantageous with regard to the manufacturing complexity. In addition, particularly well-defined fracture surfaces may be obtained. At least part of the receiving part, the at least one web and at least part of the top part preferably have a monolithic design, which may further reduce the manufacturing complexity. The top part may also have a multi-part design and include a separate sleeve made from a ductile material, on which the entrainment profile is formed.

The present invention also relates to a fastening arrangement made up of an expansion anchor and a device according to the present invention for torque limiting, the nut of the device being screwed onto a threaded rod of the expansion anchor. An expansion anchor may be understood according to usual practice to be an anchor which includes an expansion element, for example an expansion sleeve, which is offset radially to the outside for anchoring when pulled in the threaded rod.

Features which are explained in connection with the devices according to the present invention for torque limiting may also be used for the fastening arrangements according to the present invention, and conversely features which are explained in connection with the fastening arrangements according to the present invention may also be used for the devices according to the present invention for torque limiting.

BRIEF DESCRIPTION OF THE DRAWINGS

The present invention is explained in greater detail below on the basis of preferred exemplary embodiments, which are represented schematically in the attached figures, it being possible, in principle, to implement individual features of the exemplary embodiments illustrated below individually or in an arbitrary combination within the scope of the present invention.

DETAILED DESCRIPTION

Figure 1:
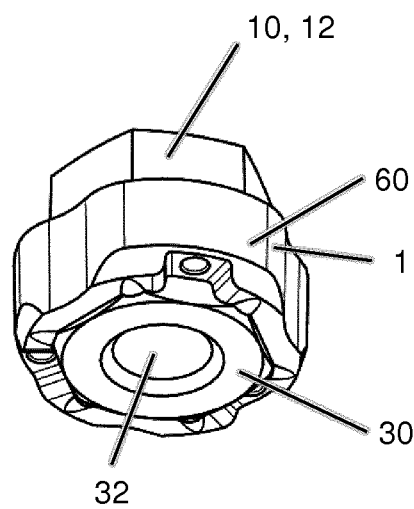
FIG. 1 schematically shows a perspective representation of one specific embodiment of a device according to the present invention for torque limiting, with a view of the front side of the device.
Figure 2:
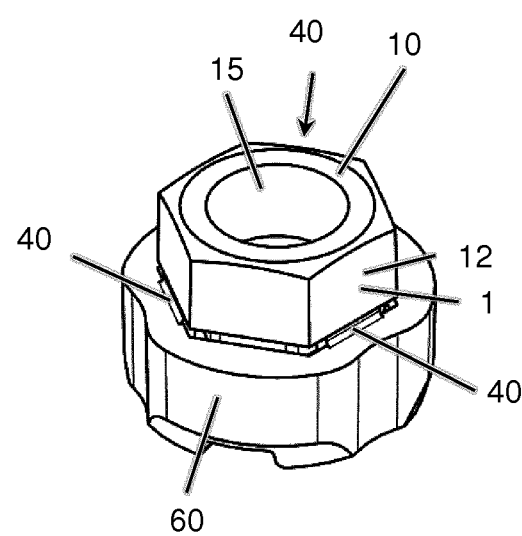
FIG. 2 schematically shows a perspective representation of the device from FIG. 1, with a view of the back side of the device.

The figures show an exemplary embodiment of a device according to the present invention for torque limiting. As these figures show, the device includes a nut 30 having a female thread 32, on the one hand, and a crown-shaped holding element 1, on the other hand, in which nut 30 is held. Holding element 1, in turn, includes a top part 10 in its rear area, a receiving part 60 in its front area, situated toward the front of top part 10, and examples of three webs 40. Webs 40 connect top part 10 and receiving part 60 and form means for torque transmission from top part 10 to receiving part 60. Webs 40 extend from top part 10 radially outwardly toward receiving part 60 which has a larger outer diameter than top part 10. Web 40, which is covered at the back in FIG. 2, has a similar design to the two webs 40 visible in FIG. 2.

A receptacle 61, in which nut 30 is accommodated, is formed in receiving part 60. Receiving part 60 has an inner hexagonal profile on receptacle 61 for the form-fitting torque transmission from receiving part 60 to nut 30, which is apparent, in particular in FIG. 4, and which corresponds to an outer hexagonal profile of nut 30. Another polygonal profile may also be provided instead of a hexagon. Additionally or alternatively, a frictionally engaged, rotatably fixed connection may also be present.

Top part 10 has an entrainment profile 12, designed for example as an outer hexagonal profile, with the aid of which a torque is transmittable from a setting tool, which is not illustrated, to top part 10 in a form-fitting manner. Receiving part 60 and top part 10 are arranged coaxially and define a shared longitudinal axis 99 of the device. Top part 10 has a passage 15, which is flush with receptacle 61 of receiving part 60, so that a threaded rod 81 screwed into nut 30 may leave out of receiving part 60 on the back side of receiving part 60 along longitudinal axis 99. Longitudinal axis 99 runs through receptacle 61 and passage 15, which opens into receptacle 61.

Figure 5:
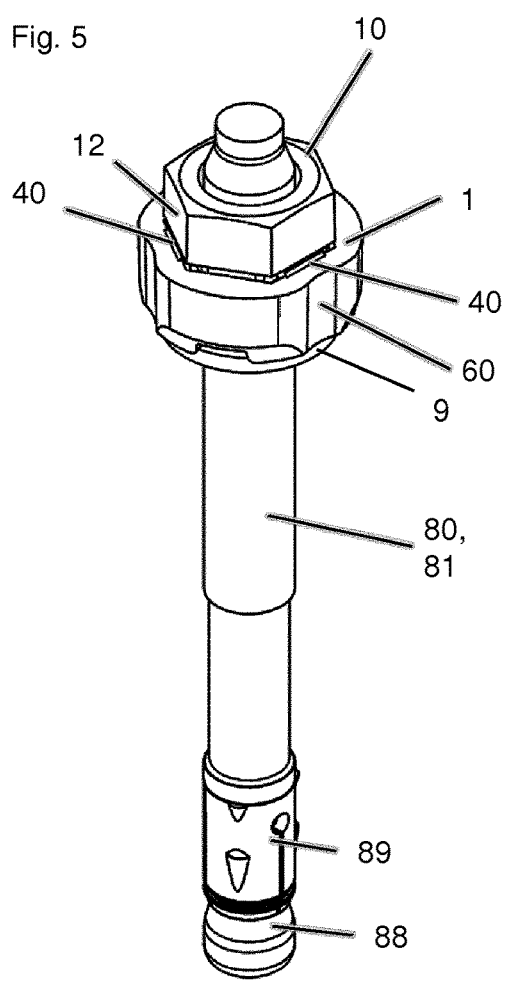
FIG. 5 schematically shows a fastening arrangement made up of a device for torque limiting according to FIGS. 1 through 4 and an expansion anchor in a perspective view, with a view of the back side of the device for torque limiting.
Figure 6:
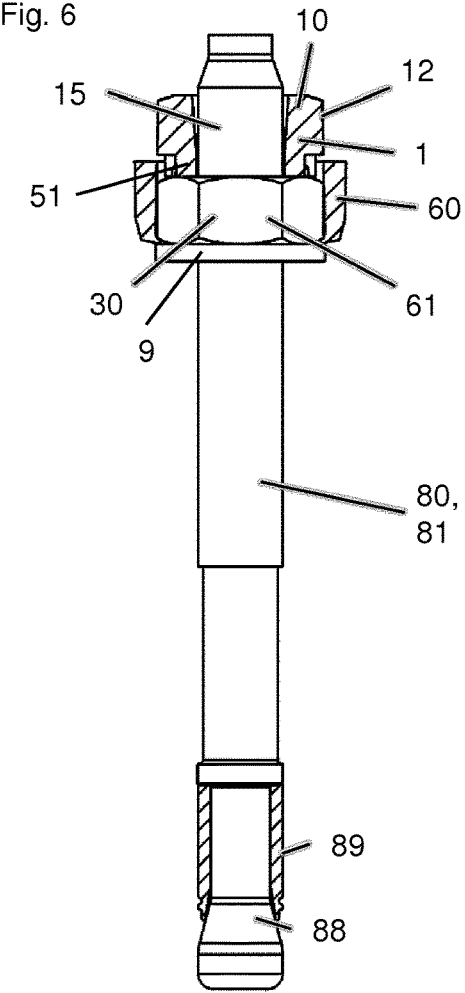
FIG. 6 schematically shows the fastening arrangement according to FIG. 5 in a partially cut, longitudinal sectional view.

FIGS. 5 and 6 show a fastening arrangement made up of the device for torque limiting and an expansion anchor 80. In mechanical anchors of this type, an installation with a defined pretension by tightening with a defined limiting torque may be relevant, for example to avoid chipping in the substrate when mounted near the edge. Expansion anchor 80 includes a threaded rod 81 as well as an expansion element 89, which in this case is designed by way of example as an expansion sleeve surrounding threaded rod 81. A preferably conical bevel 88, which tapers toward the back, is situated on threaded rod 81, in particular in a front area. A wedge gear is formed between bevel 88 of threaded rod 81 and expansion element 89, which is able to convert an axial relative movement of threaded rod 81 to expansion element 89 into a radial movement of expansion element 89 and thereby anchor expansion element 89 on the wall of a borehole under the tensile load in threaded rod 81.

In the fastening arrangement in FIGS. 5 and 6, nut 30 of the device for torque limiting is screwed onto threaded rod 81 of expansion anchor 80, threaded rod 81 of expansion anchor 80 passing through the device for torque limiting, i.e.

entering the device on the front side and emerging from the device on the back side, and bevel 88 of expansion anchor 80 and expansion element 89 of expansion anchor 80 being situated in front of the device for torque limiting.

During mounting, expansion anchor 80 of the fastening arrangement is hammered into a borehole with the aid of hammer blows onto the back side of threaded rod 81, preferably through a washer 9. A torque is thus applied to top part 10 via entrainment profile 12 with the aid of a setting tool. This torque is transmitted to receiving part 60 via webs 40 and from receiving part 60 on to nut 30. This, in turn, induces a tensile force in threaded rod 81 of expansion anchor 80, which, in turn, radially stresses expansion element 89 and thereby anchors expansion anchor 80.

Figure 7:
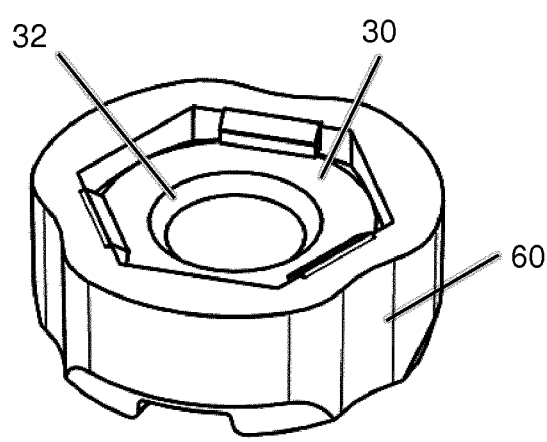
FIG. 7 shows the holding element of the device for torque limiting from FIGS. 1 through 4, including the nut after the top part has sheared off upon reaching the limiting torque, in a perspective view from above.
Figure 8:
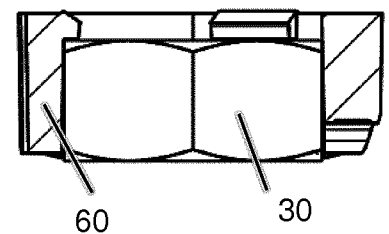
FIG. 8 shows the holding element of the device for torque limiting from FIGS. 1 through 4, including the nut after the top part has sheared off upon reaching the limiting torque, in a partial longitudinal sectional view similar to FIG. 3.

If the torque applied to top part 10 reaches a predetermined limiting torque, webs 40 shear off, resulting in the fact that top part 10 separates from receiving part 60 and torque is no longer transmitted to receiving part 60 and nut 30. The device for torque limiting therefore acts as a torque-limiting shear nut. After webs 40 shear off, top part 10 is separated from receiving part 60 and falls off receiving part 60. Remaining receiving part 60, including nut 30, is shown in FIGS. 7 and 8.

Figure 3:
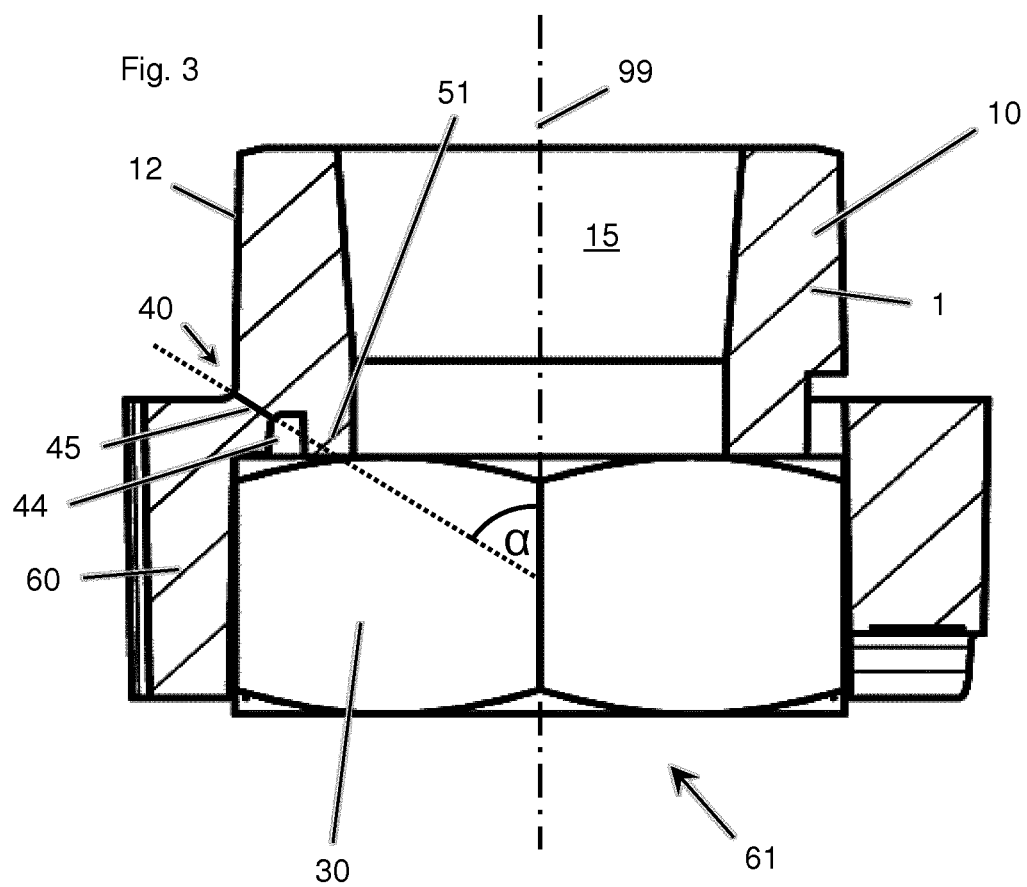
FIG. 3 shows a longitudinal sectional view of the device for torque limiting from FIGS. 1 and 2, i.e. a sectional view in a longitudinal sectional plane of the device.
Figure 4:
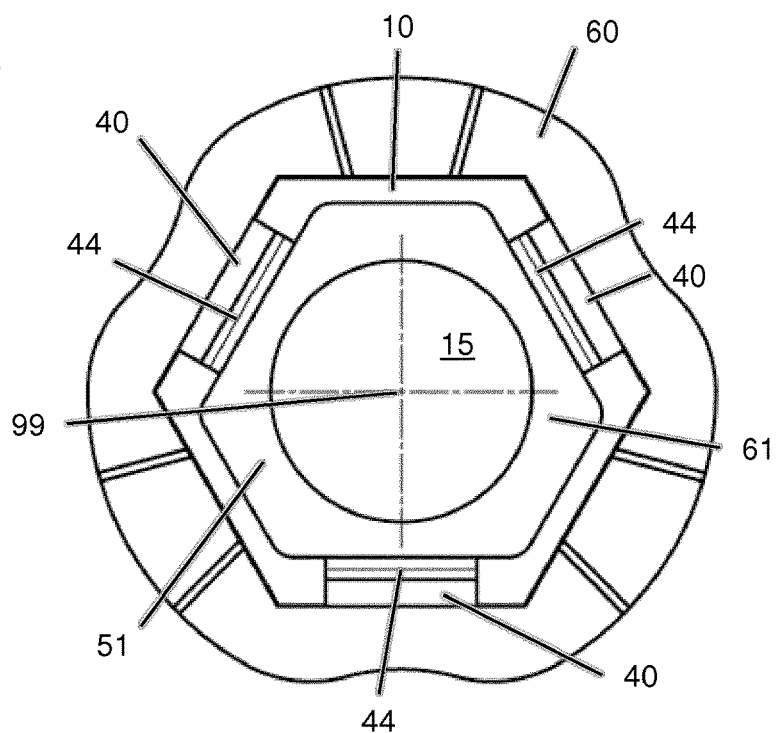
FIG. 4 shows a view from below of the holding element of the device for torque limiting from FIGS. 1 through 3, without a nut.

As is apparent in FIGS. 3, 4 and 6, in particular, top part 10 includes an axial stop 51, which is situated on the rear end face of receptacle 61 and which forms a rear stop for nut 30. Axial stop 51 limits an axial movement of nut 30 accommodated in receptacle 61 relative to top part 10 and toward the back. Axial stop 51 furthermore permits a direct transmission of axial forces, which occur for example during hammering, from top part 10 to nut 30 without stressing webs 40. The example of axial stop 51 in this case is formed by an annular, preferably closed annular projection, which protrudes from top part 10 into receptacle 61.

As further shown in FIG. 3, the smallest wall thickness of web 40 visible there is present on line segment of minimum wall thickness 45 in the longitudinal sectional plane illustrated in FIG. 3, i.e. line segment of minimum wall thickness 45 defines the minimum distance between the outside of holding element 1 and the inside of holding element 1 at web 40 in the longitudinal sectional plane. As is further shown, in particular, in FIG. 3, line segment of minimum wall thickness 45 ends at the inside of holding element 1 on the rear end face of receptacle 61, namely at a groove 44 situated in web 40 on the rear end face of receptacle 61. Axial stop 51 adjoins groove 44 radially on the inside. Groove 44 is free of undercuts in the longitudinal sectional plane, which permits a particularly easy manufacturing in a casting process. As shown in FIG. 6, the groove preferably also runs in parallel to the key surfaces of top part 10 and/or receiving part 60 situated thereabove and thereunder.

As is further shown, in particular, in FIG. 3, line segment of minimum wall thickness 45 runs at an acute angle α converging toward the front end of the device for torque limiting with respect to longitudinal axis 99, which is greater than 45° and less than 90° and, in the present example, is approximately 60°. Since the wall thickness minimum at least approximately defines the fracture line, in particular in cast parts, the fracture line at which web 40 shears off also runs at a relatively large aperture angle with respect to longitudinal axis 99, i.e. comparatively flatly relative to a transversal plane situated perpendicularly to longitudinal axis 99. Due to the fracture profile, web 40 is preserved upon the occurrence of axial forces. Line segment of minimum wall thickness 45 preferably runs in multiple adjacent longitudinal sectional planes at an angle greater than 45° with respect to longitudinal axis 99, so that, on the whole, a fracture surface running in a relatively flat manner with respect to the transversal plane is present on web 40.

As indicated in FIG. 4, the two other webs 40, which are not visible in FIG. 3, are designed similarly to visible web 40 in FIG. 3 with respect to their grooves and the position of their particular line segments of minimum wall thickness, so that the two other webs also form fracture surfaces running in a flat manner with respect to the transversal plane.

The invention claimed is:

1. A device for torque limiting, the device comprising:
a nut; and
a holding element, the holding element including a top part having an entrainment profile in a rear area of the holding element for rotatably fixed coupling of the top part with a setting tool,
the holding element including a receiving part having a receptacle in a front area of the holding element, the nut being rotatably fixedly accommodated in the receptacle, the top part having a passage, a threaded rod screwed into the nut may be led out of the holding element through the top part along a longitudinal axis of the device through the passage, and
the holding element including at least one web connecting the receiving part and the top part and forming a predetermined breaking point,
in at least one longitudinal sectional plane of the device, a smallest wall thickness of the at least one web being present on a line segment of minimum wall thickness running at an angle greater than 45° with respect to the longitudinal axis; wherein the holding element has at least one groove extending from the receptacle into the holding element and running along the at least one web, the line segment of minimum wall thickness ending at the groove.

2. The device as recited in claim 1 wherein in the at least one longitudinal sectional plane of the device, the line segment of minimum wall thickness ends at a rear end face of the receptacle.

3. The device as recited in claim 1 wherein the top part includes at least one axial stop forming a rear stop for the nut.

4. The device as recited in claim 3 wherein the groove adjoins the at least one axial stop.

5. The device as recited in claim 1 wherein the wall thickness of the at least one web has a single minimum in the at least one longitudinal sectional plane of the device.

6. The device as recited in claim 5 wherein an inside and an outside of the device in the at least one longitudinal plane run in a non-parallel manner with each other at the web at the area of the minimum wall thickness.

7. The device as recited in claim 1 wherein the holding element is a cast part.

8. A fastening arrangement comprising:
an expansion anchor; and
the device for torque limiting as recited in claim 1, the nut of the device being screwed onto the threaded rod, the threaded rod being part of the expansion anchor.

9. The fastening arrangement as recited in claim 8 wherein the threaded rod has a conical bevel.

10. The fastening arrangement as recited in claim 8 wherein the expansion anchor has an expansion element.

11. The fastening arrangement as recited in claim 10 wherein the expansion element is a sleeve surrounding the threaded rod.

12. The fastening arrangement as recited in claim 10 wherein the threaded rod has a conical bevel forming a wedge gear with the expansion element.

13. The device as recited in claim 1 wherein the at least one web includes three webs.

14. The device as recited in claim 13 wherein the three webs all have a similar design.

15. The device as recited in claim 13 wherein the three webs are arranged circumferentially about the longitudinal axis.

16. The device as recited in claim 1 wherein the receiving part has an inner hexagonal profile.

17. The device as recited in claim 16 wherein the nut has an outer hexagonal profile.

18. The device as recited in claim 1 wherein the entrainment profile has an outer hexagonal profile.

\* \* \* \* \*